US009214686B2

(12) United States Patent
Tarrant et al.

(10) Patent No.: US 9,214,686 B2
(45) Date of Patent: Dec. 15, 2015

(54) FLOW CELL WITH SHUNT CURRENT COUNTER ELECTRODE

(71) Applicant: ViZn Energy Systems, Inc., Columbia Falls, MT (US)

(72) Inventors: Derek C. Tarrant, Kalispell, MT (US); Richard M. Bendert, Kalispell, MT (US); Gerald P. Backer, Southfield, MI (US)

(73) Assignee: ViZn Energy Systems, Inc., Columbia Falls, MT (US)

( * ) Notice: Subject to any disclaimer, the term of this patent is extended or adjusted under 35 U.S.C. 154(b) by 0 days.

(21) Appl. No.: 14/192,191

(22) Filed: Feb. 27, 2014

(65) Prior Publication Data

US 2015/0244008 A1   Aug. 27, 2015

(51) Int. Cl.
*H01M 8/04* (2006.01)
*H01M 8/18* (2006.01)
*H01M 8/20* (2006.01)

(52) U.S. Cl.
CPC .......... *H01M 8/04186* (2013.01); *H01M 8/188* (2013.01); *H01M 8/20* (2013.01)

(58) Field of Classification Search
CPC ....................................................... H01M 8/04
USPC ............................................................. 429/50
See application file for complete search history.

(56) References Cited

U.S. PATENT DOCUMENTS

| 4,520,080 | A | * | 5/1985 | Hashimoto | 429/51 |
| 4,604,178 | A | | 8/1986 | Fiegener et al. | |
| 5,260,148 | A | * | 11/1993 | Idota | 429/307 |
| 6,475,661 | B1 | | 11/2002 | Pellegri et al. | |
| 2013/0157162 | A1 | | 6/2013 | Dong et al. | |

FOREIGN PATENT DOCUMENTS

WO   2013118277 A1   8/2013

OTHER PUBLICATIONS

International Search Report and Written Opinion of the International Searching Authority for PCT/US2015/017739, dated Jun. 10, 2015, 7 pages.

* cited by examiner

*Primary Examiner* — Jacob Marks
(74) *Attorney, Agent, or Firm* — Brooks Kushman P.C.

(57) ABSTRACT

Counter electrodes are used within the context of a flow cell to attract shunt current depositions during operation. The counter electrodes may be electrically connected with an anode of the flow cell to attract the depositions and then electrically connected with a cathode of the flow cell to remove the depositions.

9 Claims, 4 Drawing Sheets

FLOW CELL WITH SHUNT CURRENT COUNTER ELECTRODE

TECHNICAL FIELD

This disclosure relates to shunt current management within flow cells.

BACKGROUND

A typical electrochemical cell may include a cathode side and anode side separated by a separator arrangement. The cathode side may include a cathode current collector, a cathode electroactive material (reduced on discharge) and an electrolyte. The anode side may include an anode current collector, an anode electroactive material (oxidized on discharge) and an electrolyte. The separator arrangement separating the cathode and anode sides, inter alia, permits ionic flow therebetween. The current collectors, electroactive materials, electrolytes and separator arrangement thus form an electrochemical reactor that converts chemical energy to electricity. The current collectors may be (externally) electrically connected together to form an electrical circuit.

SUMMARY

A flow battery includes a flow cell. The flow cell includes an anode and cathode, and a counter electrode that can be switched between a potential approximately equal to the anode to attract shunt current depositions and a potential approximately equal to the cathode to remove the shut current depositions.

A flow battery includes a flow cell. The flow cell includes a cathode partially defining a cathode chamber, an anode partially defining an anode chamber, and a separator arrangement sandwiched between the cathode and anode chambers and configured to permit ionic flow between electroactive materials flowing through the cathode and anode chambers. The flow cell also includes a counter electrode that can be switched between being electrically connected with the anode and electrically connected with the cathode.

A method of controlling a battery includes causing, by a controller, a counter electrode disposed within a path of flowing electroactive materials to have a potential approximately equal to an anode of the battery to attract shunt current depositions on the counter electrode, and subsequently causing, by the controller, the counter electrode to have a potential approximately equal to a cathode of the battery to remove the shunt current depositions.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A flow cell is a type of rechargeable cell in which electrolyte containing one or more dissolved electroactive species flows through (into and out of) an electrochemical reactor that converts chemical energy to electricity. Additional electrolyte containing one or more dissolved electroactive species is stored externally, generally in tanks, and is usually pumped through the electrochemical reactor (or electrochemical reactors). A flow cell may thus have variable capacity depending on the size of the external storage tanks.

Figure 1:
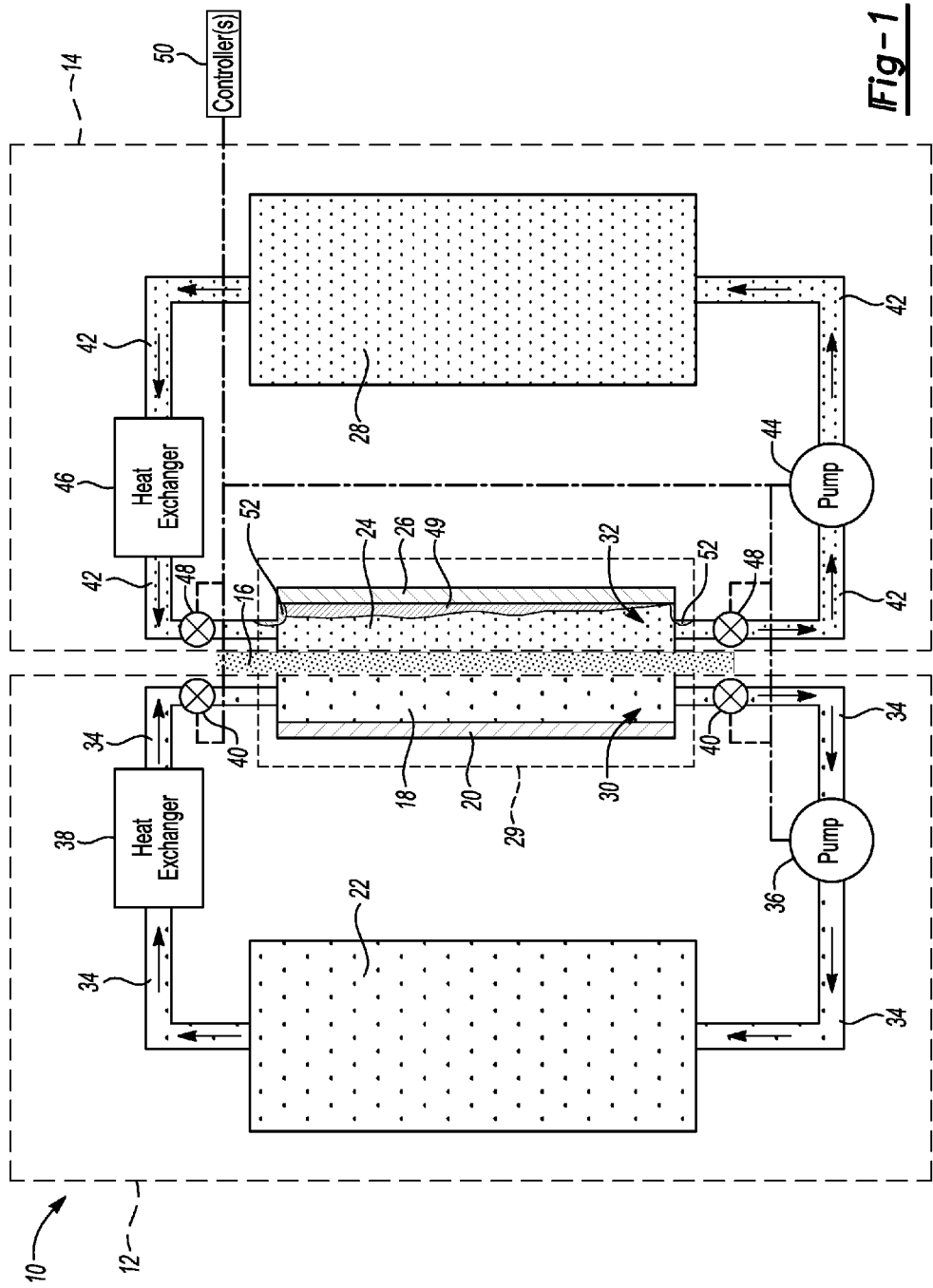
FIG. 1 is a schematic diagram of a flow cell system.

Referring to FIG. 1, a flow cell 10 may include a cathode side 12 and an anode side 14 separated by a separator 16 (e.g., an ion exchange membrane). The cathode side 12 includes a cathode chamber 18, cathode current collector 20 and catholyte reservoir 22. Likewise, the anode side 14 includes an anode chamber 24, anode current collector 26 and anolyte reservoir 28. The separator 16 permits ionic flow between electroactive materials in the cathode and anode chambers 18, 24. The chambers 18, 24, current collectors 20, 26 and separator 16 thus form an electrochemical reactor 29 that converts chemical energy to electricity (and, in certain arrangements, electricity to chemical energy). As such, the cathode 20 and anode 26 may be (externally) electrically connected (together or with other anodes and cathodes respectively) to form an electrical circuit.

Catholyte 30 and anolyte 32 typically combine an electrolyte used to transport ions with cathode and anode reactive materials, respectively, through soluble intermediates. The catholyte 30 and anolyte 32 are circulated on respective sides of the cell 10 to drive the reaction within the electrochemical reactor 29. Hence, the catholyte 30 and anolyte 32 are mobile. To that end, the cathode side 12 further includes inlet/outlet pipes 34 in fluid communication with the cathode chamber 18 and catholyte reservoir 22, and circulation pump 36, heat exchanger 38 and valves 40 each operatively arranged with the inlet/outlet pipes 34. The circulation pump 36, as the name suggests, circulates the catholyte 30 through the cathode chamber 18, catholyte reservoir 22 and inlet/outlet pipes 34. The heat exchanger 38 may be operated to control the temperature of the catholyte 30. The valves 40 may be operated to control the flow of catholyte 30 into and/or out of the cathode chamber 18.

The anode side 14 includes inlet/outlet pipes 42, circulation pump 44, heat exchanger 46 and valves 48. The inlet/outlet pipes 42 are in fluid communication with the anode chamber 24 and anolyte reservoir 28, and circulation pump 44, heat exchanger 46 and valves 48 are each operatively arranged with the inlet/outlet pipes 42. The circulation pump 44 circulates the anolyte 32 through the anode chamber 24, anolyte reservoir 28 and inlet/outlet pipes 42. The heat exchanger 46 may be operated to control the temperature of the anolyte 32. The valves 48 may be operated to control the flow of anolyte 32 into and/or out of the anode chamber 24.

The anode side 14 may include a slurry of ZnO and NaOH mixed in the anolyte reservoir 28 to ensure maximum dissolution of active material (zincate) in the solution. This solution may be used as the anolyte 32 for the flow cell 10. On charge, the soluble zincate is reacted at the surface of the anode 26 to deposit Zn metal 49 on the anode surface adjacent to the anode chamber 24. On discharge, a load reverses the reaction oxidizing the Zn metal 49 off the surface of the anode 26. The zincate species is only marginally soluble in the anolyte 32 so the majority of the discharged material precipitates as ZnO. This discharge product is normally stored in the reservoir 28 but should be managed to ensure it does not deposit elsewhere in the system and possibly plug flow channels or mask surface area changing the current distribution.

One or more controllers 50 may operate the circulation pumps 36, 44 and valves 40, 48 to flow the catholyte 30 and anolyte 32 into and out of the chambers 18, 24 and reservoirs 22, 28 respectively as indicated by heavy dashed line. Such flow often requires sophisticated flow and temperature controls. With multiple cells (as in a battery), a typical flow system may become more complicated because the same reservoir may be used for the multiple cells.

The use of a single reservoir with multiple cells may result in an ionic path (or shunt current) between cells. Zn redistribution as a result of shunt currents during charge may be undesirable. Shunt current deposits 52, for example, may collect in the inlet/outlet pipes 42—restricting flow therein and potentially starving the anode chamber 24.

Certain examples described herein attempt to handle this undesirable deposition in a sustainable fashion. Separate counter electrodes may be placed within the cell. In one example, the counter electrodes are placed on the electrode surface (but insulated from it) in the inlet and outlet anolyte path between the normal deposition area on the electrode and the inlet and outlet manifolds. The counter electrodes, in another example, are spaced away from the anode adjacent to the inlet and outlet manifolds. In either case, the counter electrodes should be spaced sufficiently away from the anode so as to avoid the shunt deposition from coming into contact therewith. Other arrangements are also contemplated. For example, a single counter electrode may be used, etc.

The counter electrodes may comprise, for example, any metal or alloy not consumed (corroded) by the electrolyte (e.g., Ni, Sn, stainless steel). It may also be advantageous to select, in certain circumstances, a material which has a propensity to parasitically discharge deposits. Additionally, more counter electrode surface area may be advantageous as compared with less.

Initially, both counter electrodes are electrically connected with the base electrode (e.g., anode), which places them at the same electrical potential as the base electrode. (The counter electrodes, of course, may instead be electrically connected with a potential approximately equal to the base electrode.) Being at the same potential as the base electrode, and between it and the source of shunt current ionic flow, these counter electrodes attract a majority of shunt current deposits to prevent them from significantly forming on the base electrode or elsewhere in the system.

When a mass of shunt deposited Zn has built up on the counter electrodes, the connection between them and the base electrode is severed. And, the counter electrodes are instead connected to the cathode of the cell in question (or a potential approximately equal to the cathode). This effectively short circuits the part of the cell formed by the two counter electrodes and the cathode. Being shorted to the cathode and positioned so as to be in close proximity to its surface (separated by the membrane), a high current will rapidly flow, discharging each counter electrode to remove the shunt deposited Zn. During this relatively short time period, new shunt current deposits may attempt to attach to the counter electrodes but may be discharged by the same process. Once the counter electrode discharge currents are sensed to be zero (or upon expiration of a predefined time period, etc.), the connections to the cathode are severed, the connections to the anode are re-established, and shunt current protection of the respective base electrode resumes.

In other examples, testing may be conducted to determine the frequency with which the counter electrode (or electrodes) should be switched between a potential approximately equal to the anode and a potential approximately equal to the cathode. Chamber flow rates, system chemistry, number of cells, tank volume, etc. may impact the rate at which shunt depositions form and are removed. This timing can then be implemented by a controller tasked with the switching described above.

Figure 2A:
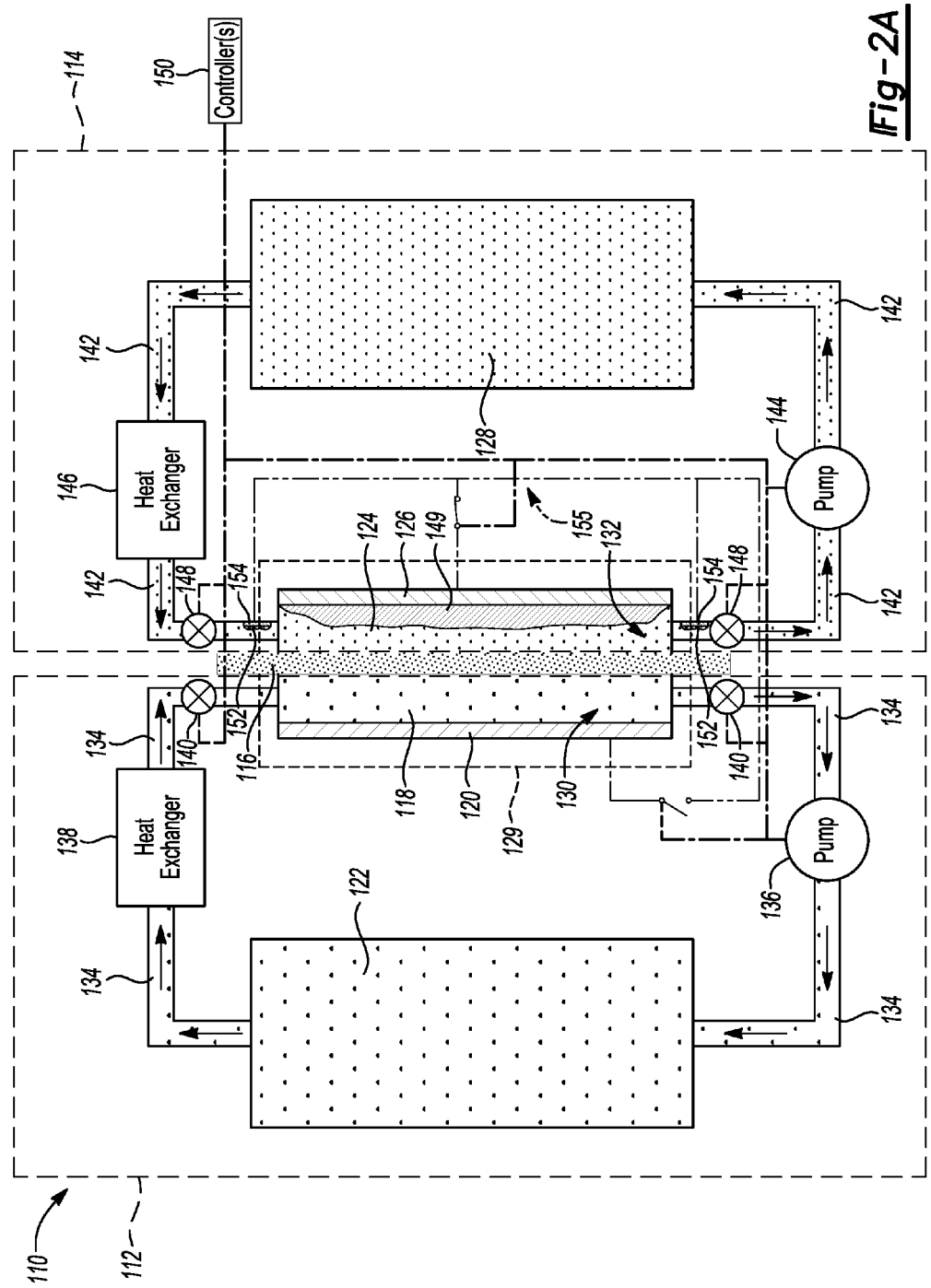
FIGS. 2A and 2B are schematic diagrams of a flow cell system with shunt current electrodes.
Figure 2B:
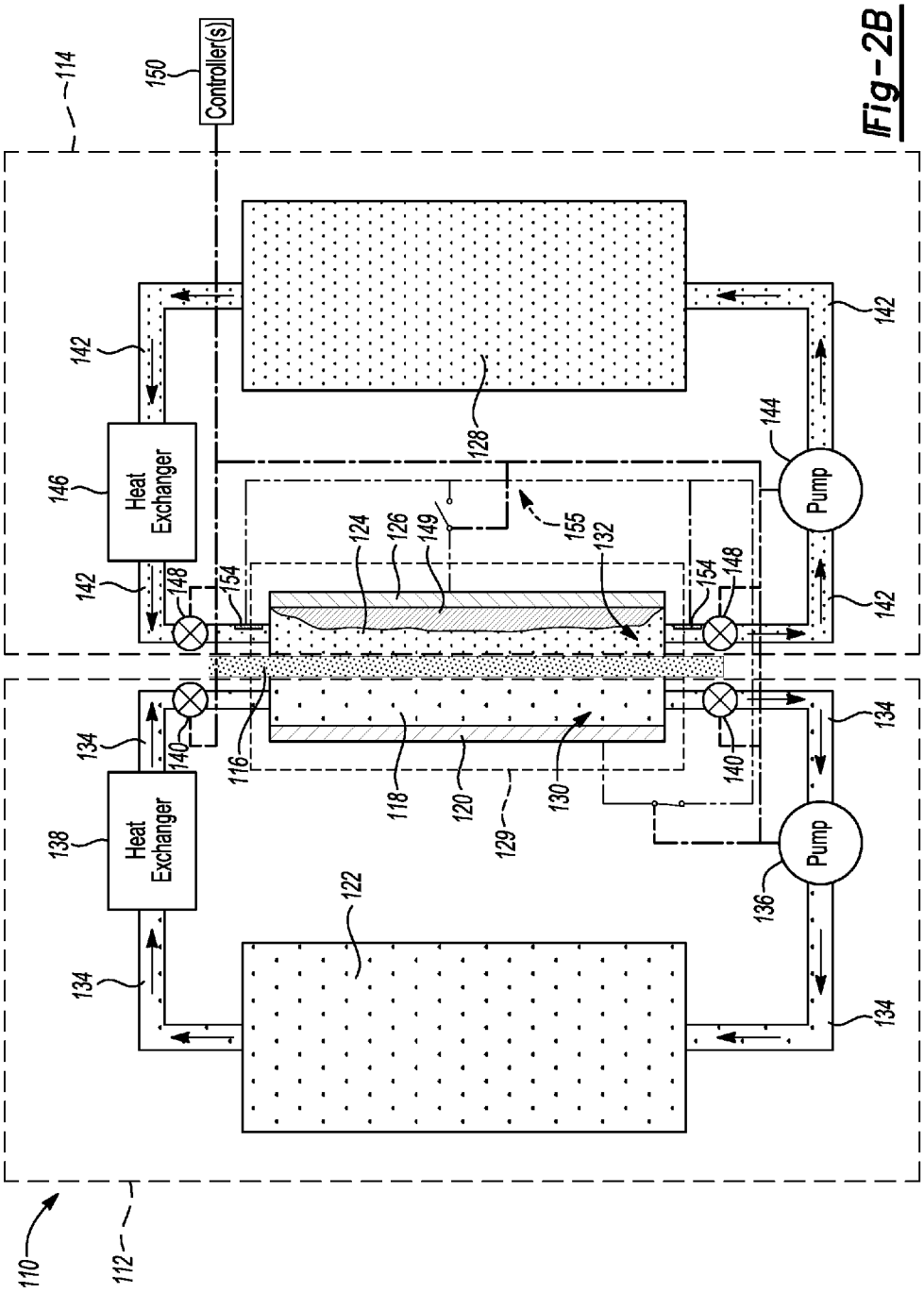

Referring to FIGS. 2A and 2B in which like numbered elements may share similar descriptions, a flow cell 110 may include a cathode side 112 and an anode side 114 separated by a separator 116. The cathode side 112 includes a cathode chamber 118, cathode current collector 120 and catholyte reservoir 122. Likewise, the anode side 114 includes an anode chamber 124, anode current collector 126 and anolyte reservoir 128. The separator 116 permits ionic flow between electroactive materials in the cathode and anode chambers 118, 124. The chambers 118, 124, current collectors 120, 126 and separator 116 thus form an electrochemical reactor 129 that converts chemical energy to electricity (and, in certain arrangements, electricity to chemical energy).

Catholyte 130 and anolyte 132 typically combine an electrolyte used to transport ions with cathode and anode reactive materials, respectively, through soluble intermediates. The catholyte 130 and anolyte 132 are circulated on respective sides of the cell 110 to drive the reaction within the electrochemical reactor 129. To that end, the cathode side 112 further includes inlet/outlet pipes 134 in fluid communication with the cathode chamber 118 and catholyte reservoir 122, and circulation pump 136, heat exchanger 138 and valves 140 each operatively arranged with the inlet/outlet pipes 134.

The anode side 114 includes inlet/outlet pipes 142 (e.g., manifolds), circulation pump 144, heat exchanger 146 and valves 148. The inlet/outlet pipes 142 are in fluid communication with the anode chamber 124 and anolyte reservoir 128, and circulation pump 144, heat exchanger 146 and valves 148 are each operatively arranged with the inlet/outlet pipes 142.

The anode side 114 may include a slurry of ZnO and NaOH mixed in the anolyte reservoir 128 to ensure maximum dissolution of active material (zincate) in the solution. (Other appropriate chemistries, however, may also be used.) This solution may be used as the anolyte 132 for the flow cell 110. On charge, the soluble zincate is reacted at the surface of the anode 126 to deposit Zn metal 149 on the anode surface adjacent to the anode chamber 124. On discharge, a load reverses the reaction oxidizing the Zn metal 149 off the surface of the anode 126.

One or more controllers 150 may operate the circulation pumps 136, 144 and valves 140, 148 to flow the catholyte 130 and anolyte 132 into and out of the chambers 118, 124 and reservoirs 122, 128 respectively as indicated by heavy dashed line.

Counter electrodes 154 (e.g., Ni foil) are located within the inlet/outlet pipes 142 near the electrochemical reactor 129 in this example. Switchable circuitry 155 selectively electrically connects the counter electrodes 154 to the anode 126 (FIG. 2A) or the cathode 120 (FIG. 2B). The one or more controllers 150 control actuation of the switchable circuitry 155 (as indicated by heavy dashed line) according to, in this example, a timing schedule developed via testing and optimized for specific design and operating conditions.

Figure 3:
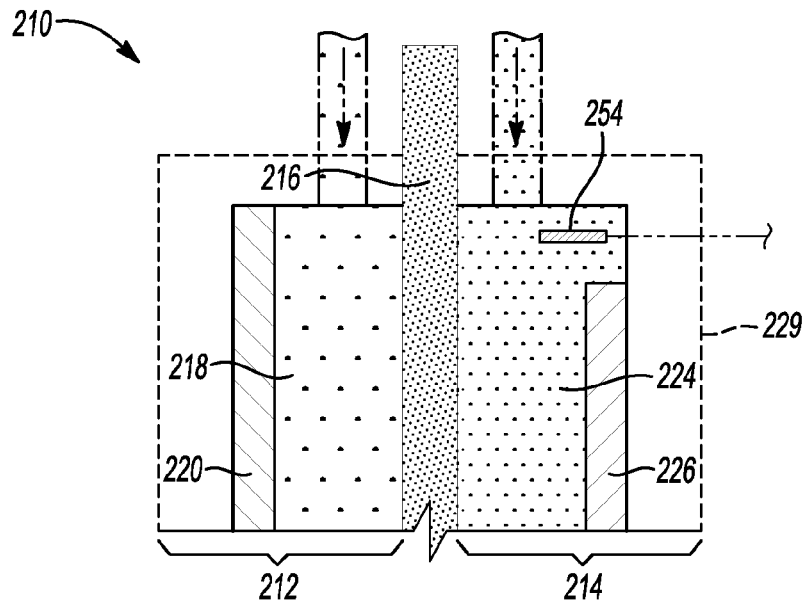
FIGS. 3 and 4 are schematic diagrams of alternative shunt current electrode arrangements.

Referring to FIG. 3 in which like numbered elements may share similar descriptions, a flow cell 210 may include a cathode side 212 and an anode side 214 separated by a separator 216. The cathode side 212 includes a cathode chamber 218 and cathode current collector 220. Likewise, the anode side 214 includes an anode chamber 224 and anode current collector 226. These elements may form an electrochemical reactor 229.

A counter electrode 254 is disposed within the anode chamber 224 near a same wall as the inlet and spaced sufficiently away from the anode 226 so that shunt depositions do not come into contact with the anode 226.

Figure 4:
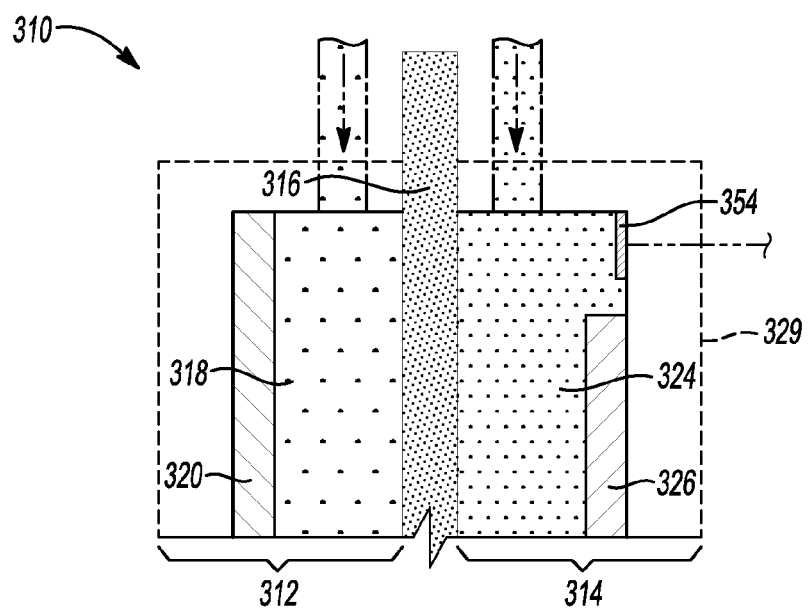

Referring to FIG. 4 in which like numbered elements may share similar descriptions, a flow cell 310 may include a cathode side 312 and an anode side 314 separated by a separator 316. The cathode side 312 includes a cathode chamber 318 and cathode current collector 320. Likewise, the anode side 314 includes an anode chamber 324 and anode current collector 326. These elements may form an electrochemical reactor 329.

A counter electrode 354 is disposed within the anode chamber 324 on a same wall as the anode 326 and spaced sufficiently away from the anode 326 so that shunt depositions do not come into contact with the anode 326.

While exemplary embodiments are described above, it is not intended that these embodiments describe all possible forms encompassed by the claims. For example, the counter electrodes contemplated herein may be used in flow cells in which electroactive materials in the cathode chamber do not flow into and out of the cathode chamber during operation and electroactive materials flow into and out of the anode chamber during operation. Other scenarios are also possible.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A flow battery comprising:
   a flow cell including an anode and cathode;
   a counter electrode; and
   a controller configured to switch the counter electrode between a potential approximately equal to the anode to attract shunt current depositions and a potential approximately equal to the cathode to remove the shunt current depositions.

2. The flow battery of claim 1, wherein the flow cell further includes an anode chamber and a manifold configured to deliver active material to the anode chamber and wherein the counter electrode is disposed within the manifold.

3. The flow battery of claim 1, wherein the flow cell further includes an anode chamber and wherein the counter electrode is disposed within the anode chamber.

4. The flow battery of claim 1 further comprising circuitry electrically connected with the anode, cathode and counter electrode.

5. The flow battery of claim 1, wherein the counter electrode comprises nickel, tin, or stainless steel.

6. A flow battery comprising:
   a flow cell including a cathode partially defining a cathode chamber, an anode partially defining an anode chamber, and a separator arrangement sandwiched between the cathode and anode chambers and configured to permit ionic flow between electroactive materials flowing through the cathode and anode chambers;
   a counter electrode; and
   a controller configured to switch the counter electrode between being electrically connected with the anode and electrically connected with the cathode.

7. The flow battery of claim 6, wherein the counter electrode is disposed within the anode chamber.

8. The flow battery of claim 6 further comprising a manifold configured to deliver the electroactive materials to the anode chamber, wherein the counter electrode is disposed within the manifold.

9. The flow battery of claim 6, wherein the counter electrode comprises nickel, tin, or stainless steel.

* * * * *